United States Patent [19]

Fisher

[11] Patent Number: 4,830,143

[45] Date of Patent: May 16, 1989

[54] COMPACT, LEVERAGED FORK UNIT AND DEVICE FOR SUPPORTING WEIGHTED OBJECTS UPON POLE SHAPED PROJECTIONS

[76] Inventor: Donald F. Fisher, Rte. 1, Eastman, Wis. 54626

[21] Appl. No.: 231,156

[22] Filed: Aug. 10, 1988

[51] Int. Cl.[4] .............................................. A45F 3/26
[52] U.S. Cl. .................................. 182/135; 182/187; 248/231; 108/152
[58] Field of Search ............... 182/187, 188, 135, 136; 108/152; 248/231

[56] References Cited

U.S. PATENT DOCUMENTS

| | | | |
|---|---|---|---|
| 852,623 | 5/1907 | Roth | 248/231 |
| 1,206,574 | 11/1916 | Miller | 182/187 |
| 2,394,203 | 2/1946 | Pruder | 182/187 |
| 3,368,725 | 2/1968 | Martin | 182/187 |
| 3,719,252 | 3/1973 | Tiley | 182/187 |
| 3,885,649 | 5/1975 | Damron | 182/187 |
| 4,113,058 | 9/1978 | Kobosh | 182/187 |
| 4,124,094 | 11/1978 | Cande | 182/187 |
| 4,475,627 | 10/1984 | Eastridge | 182/187 |
| 4,484,660 | 11/1984 | Baynum | 182/187 |
| 4,597,473 | 7/1986 | Peck | 182/187 |
| 4,600,081 | 7/1986 | Wade | 182/187 |
| 4,601,364 | 7/1986 | York | 182/187 |

Primary Examiner—Reinaldo P. Machado
Attorney, Agent, or Firm—M. Paul Hendrickson

[57] ABSTRACT

The present invention provides a weight bearing device adapted to support weighted objects upon vertically extending pole-shaped objects such as wooden poles and trees. The device comprises an anchoring strap and a forked unit fitted with a leveraged support frame, a forked end member having terminal penetrating tips and radially extending downwardly and outwardly from the support frame. The strap is mounted at a pivotal site along the support frame. In operational use, the penetrating tips are aligned onto the pole-shaped object with the strap being looped about the pole and adjustably anchored onto the mount under sufficient strap tension to allow the major longitudinal axis of the forked unit frame to extend upwardly and outwardly therefrom. The adjusted strap tension should, however, be sufficient to permit the strap when further tightened by the leveraged action of the forked unit to form a pivotal anchoring site about the strap mount. By applying a downward force onto the support frame, the penetrating tips will swing inwardly and upwardly about the pivotal mount site causing the strap to grippingly tighten about the object and the tips to penetrate the object and thereby firmly anchor the weight bearing device thereto.

20 Claims, 4 Drawing Sheets

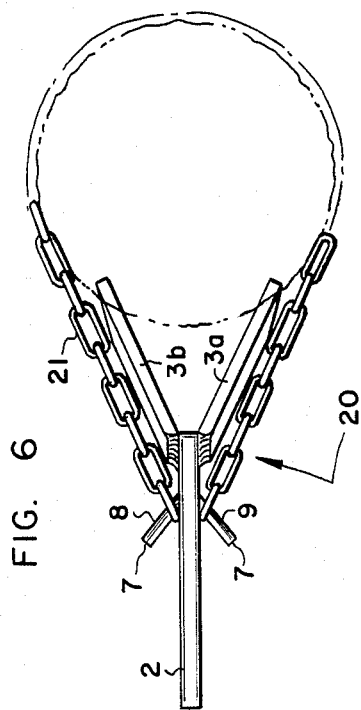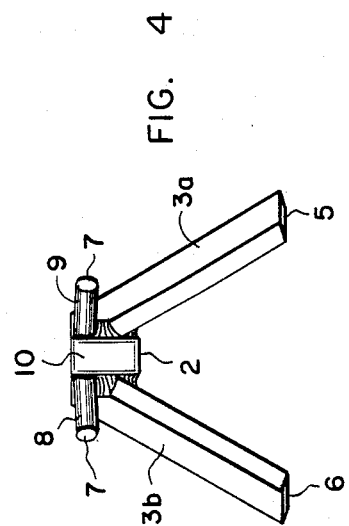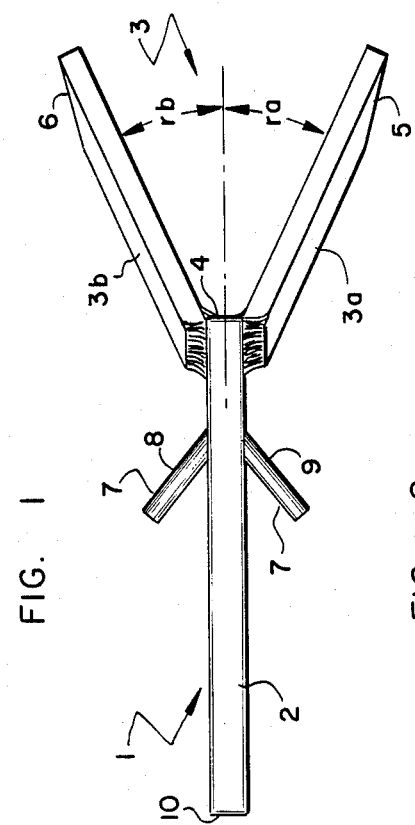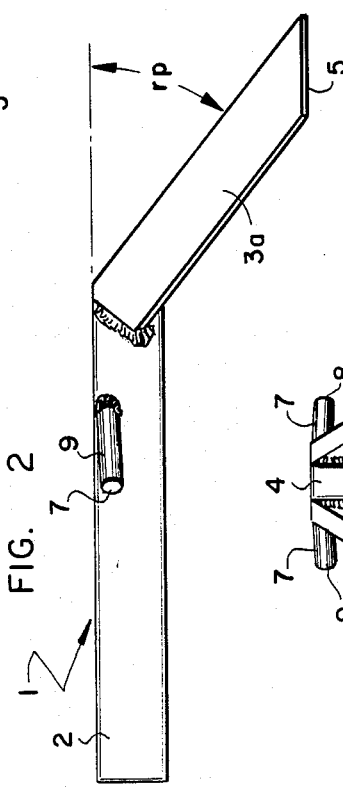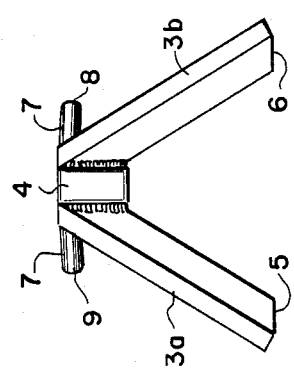

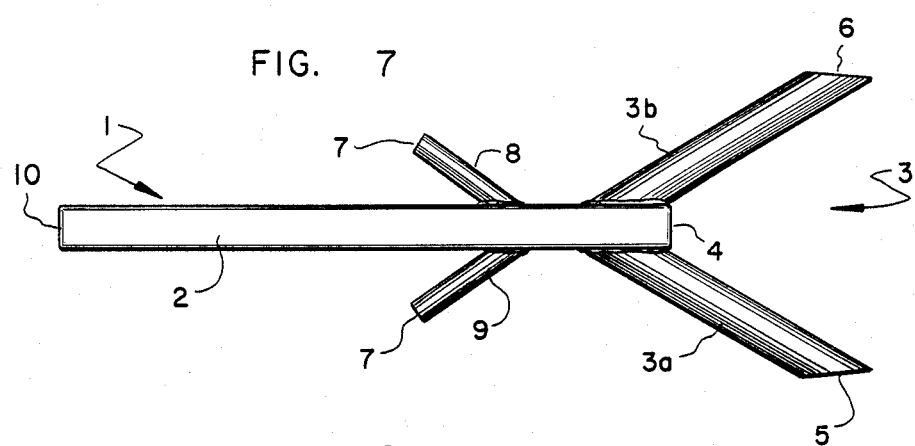
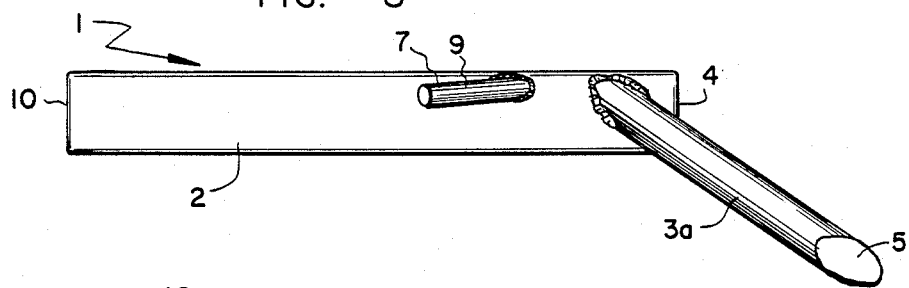
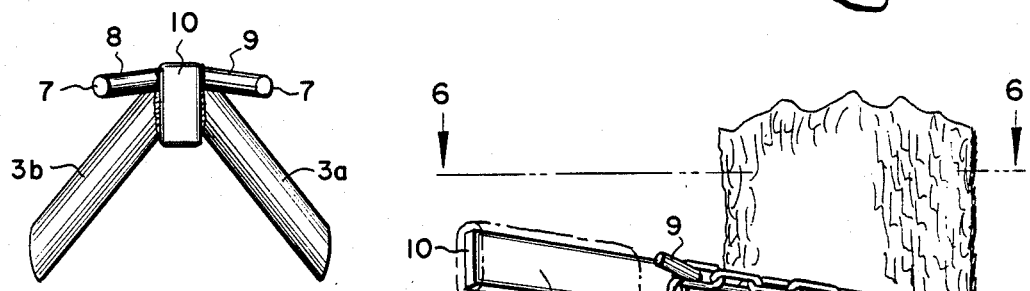
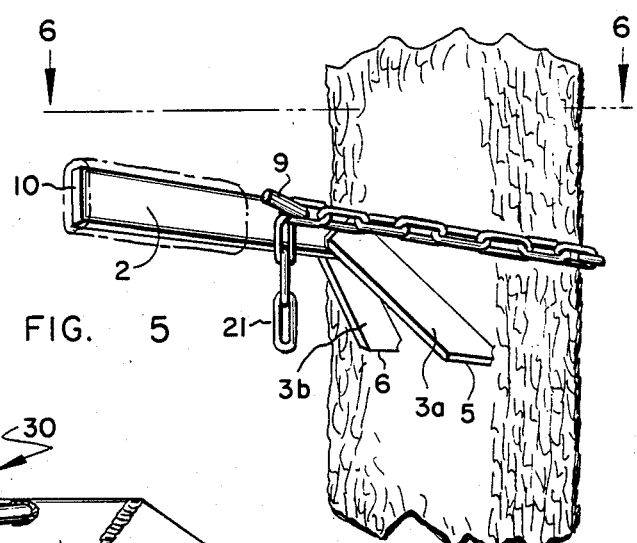
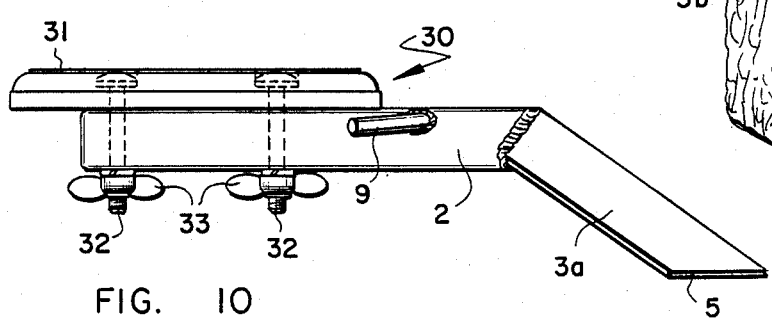

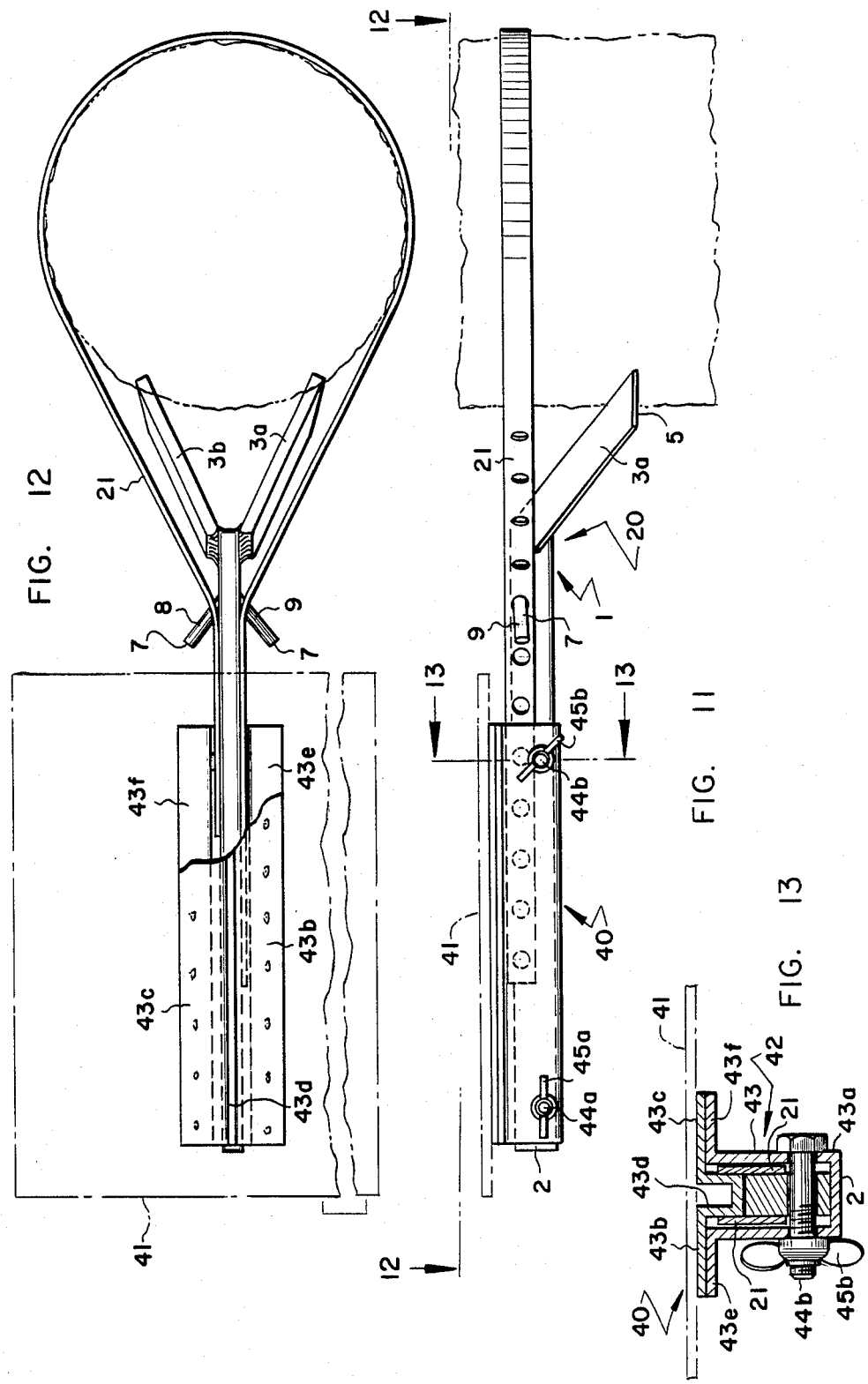

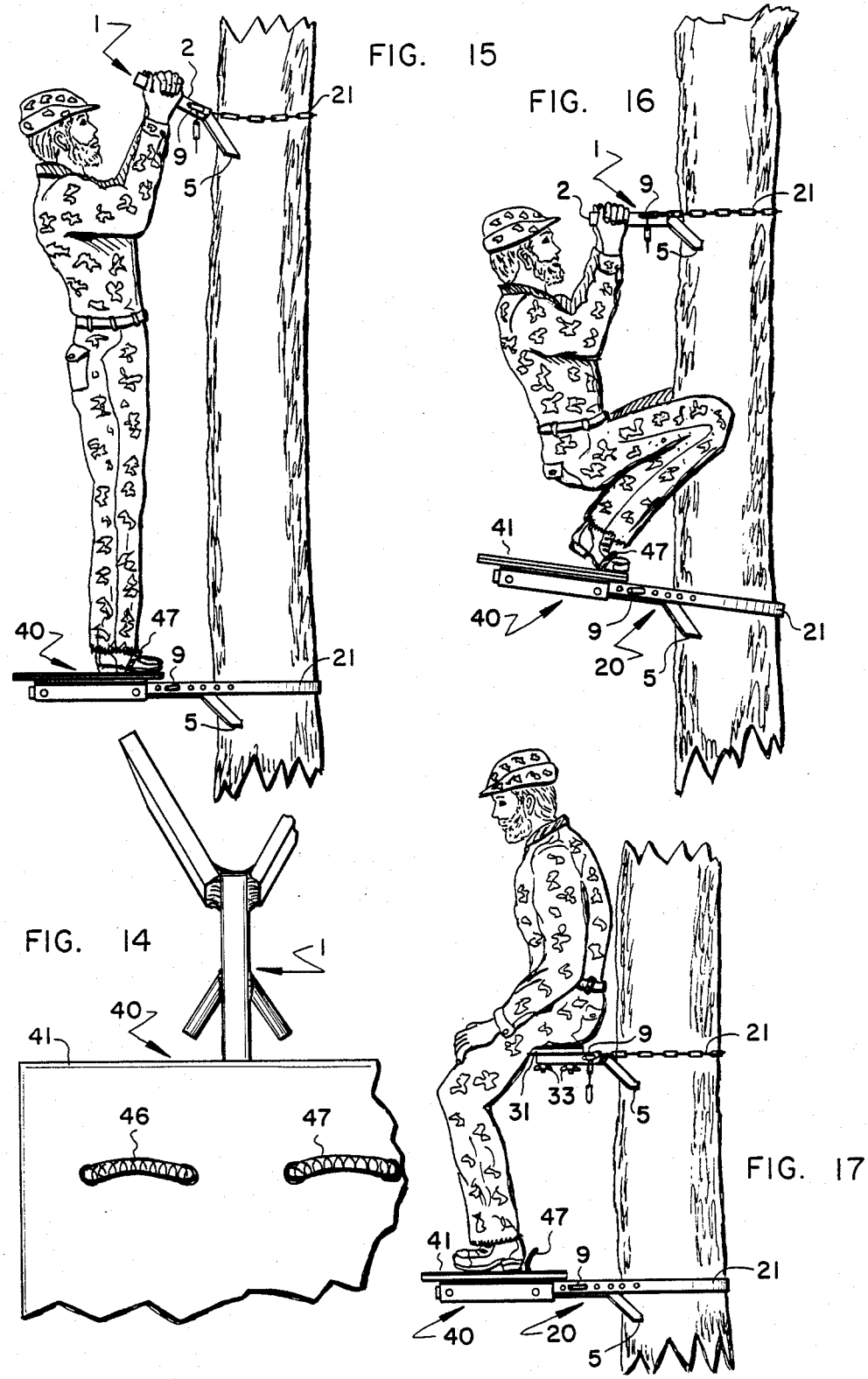

COMPACT, LEVERAGED FORK UNIT AND DEVICE FOR SUPPORTING WEIGHTED OBJECTS UPON POLE SHAPED PROJECTIONS

SUMMARY OF THE INVENTION

The present invention relates to portable support devices, and more particularly to a portable support device adapted for securance to a vertical projection having a penetratable surface, such as a tree or wood pole, so as to provide support to a weighted object at an elevated position.

BACKGROUND OF THE INVENTION

Portable support devices equipped with flexible straps (e.g. chains, leather straps, etc.) adapted for adjustable securance to vertical projections in support of weighted objects at elevated positions are known. Such devices are often used by outdoorsmen and sportsmen to climb trees or as tree stands. illustrative patents disclosing such devices include U.S. Pat. Nos.: 1,206,574; 2,394,203; 3,368,725; 3,885,649; 4,113,058; 4,124,094; 4,475,627; 4,484,660; and 4,600,081.

The U.S. Pat. No. 4,600,081, to Wade, relates to a portable tree seat comprised of a platform, connected to symmetrically aligned support plates laterally separated from and permanently connected to one another by means of two elongaed traverse members. U.S. Pat. No. 2,394,203 by Pruder discloses a portable tree seat comprising a seat structure having a central seat support member, a chain attached to one end of the seat structure for looping around a tree, and two pronged members hinged to the underside of the seat for engagement to the tree. The U.S. Pat. No. 3,885,649 to Damron discloses a tree stand comprised of a platform attached laterally to a chain adaptable to encircling a tree with the platform being affixed onto a support member equipped with converging sharpened legs extending from the underside thereof for placement into the tree. The U.S. Pat. No. 1,206,574 by Miller appertains to a tree scaffolding device having a platform fitted with outwardly projecting spurs at one end of the platform and a brace arm, projecting downwardly from the platform, fitted with a terminal spur for engagement with the tree. The U.S. Pat. No. 4,475,627, to Eastridge, disclosed a combination camp stool and tree stand having a chain wedge bar combination which reportedly provides a stable tree mount without damage to the tree. The remaining U.S. patents cited above appertain to devices which similarly illustrate other variations of such devices.

As typified by the aforementioned cited U.S. patents, a major prior art problem arises from the inability to provide a light weight, compact, easily transportable, readily engagable and disengagable pole climbing or support device without sacrificing its stability, tenaciousness of grip, over-all safety and efficacy. Improvements in one or more of such undesirable deficiences of prior devices has generally accomplished at the expense of other equally important functional attributes. As typified by the aforementioned cited patents, sportsmen and outdoorsmen have long desired a light weight, compact climbing or support device which may be easily carried into the remote wilderness areas while also affording tenacious and safe securance onto a vertical projection at the desired elevational height. Attempts to reduce the over-all bulkiness and weight of such prior devices have generally been at the expense of safety, durability, stability, load bearing capacity, and over-all efficacy of the device. The prior art devices designed for increased weight bearing capacity have been generally accomplished through implementation of heavier, more bulky and complex design at the expense of convenience, portability and general inability for the single unassisted sportsman or outdoorsman to easily and safely secure the device at the desired elevational height.

Notwithstanding prior attempts to increase weight bearing capacity and to achieve a more firm securance and stability of the device onto trees or other similar objects through reliance upon the more heavier, bulky and complex designs, these prior devices still lack the means for safely, securely and tenaciously locking the device onto such vertical projections. Although the prior devices have been equipped with cleated or sharpened members to functionally serve as an ancillary load bearing support, a major portion of the weight bearing support in such devices remains predominately borne by the frictional grip of its strap or chain supports. The pole or tree engaging components of these prior art devices generally function independently of one another without any appreciable and coopertive interrelationship therebetween.

There exists a long felt need for a compact, lightweight pole climbing or weight bearing device which combines the performance, the versatility, convenience, durability, safety, ease for engagement and disengagement at the desired height, reliability, portability, load bearing capacity, stability, and cooperative interrelationship between its engaging components to firmly secure and lock the device onto a tree or other similar vertical projection. The inventor sought to overcome these prior art deficiencies by creating an improved portable weight bearing device which collectively embodies these desired functional attributes into one device without compromising upon its over-all efficacy for its intended purpose and use. The inventor desired to create a device which operationally functioned as a tooled instrument. A cooperative and operational functional interrelationship between the vertical projection and the device were sought by the inventor. As will become more evident from the following written description and accompanying drawngs, the climbing and weight supporting device of this invention effectively overcomes those problems inherently attendant to such prior art devices while also embodying substantial improvements thereover.

DESCRIPTION OF THE DRAWINGS

FIG. 1 shows a top view of a forked support unit of this invention.

FIG. 2 is a side view of the forked support unit shown in FIG. 1.

FIG. 3 is a front view of the forked support unit shown in FIGS. 2 and 3.

FIG. 4 is a rear view of the forked support unit.

FIG. 5 is a side view of the forked support unit equipped with a chain looped around and secured onto a tree section.

FIG. 6 is a cross-sectional view taken along line 6—6 of FIG. 5.

FIG. 7 is a top view of a modified version of the forked support unit.

FIG. 8 is a side view of the forked support unit shown in FIG. 7.

FIG. 9 is a rear view of the forked support unit shown in FIG. 7.

FIG. 10 is a side view of the forked unit shown in FIG. 1 with a seat attachment secured thereto.

FIG. 11 is a side view depicting the support unit of FIG. 1 fitted with a tree stand attachment secured onto a tree section.

FIG. 12 is a view taken along line 12 of FIG. 11.

FIG. 13 is a cross-sectional view taken along line 13—13 of FIG. 12.

FIG. 14 is a top view of a tree stand.

FIG. 15 is a side view which illustrates a person standing upon the tree stand of FIG. 11 in the act of securing the forked support device of this invention onto a tree section.

FIG. 16 is a side view depicting a person using the secured device depicted in FIG. 5 raising the tree stand shown in FIG. 15 to a more elevated tree position.

FIG. 17 is a side view showing a person supported in a seated position by the tree seat and the tree stand embodiments of this invention.

DETAILED DESCRIPTION OF THE INVENTION

A fuller appreciation of the forked support unit and the forked support device of this invention and its use to ascend and descend vertical projections or support weighted objects thereupon may be observed by reference to FIGS. 1-17.

FIGS. 1-7, 7-10 and FIG. 14 illustrate the leveraged forked support unit of this invention (generally designated as 1) while FIGS. 5-6, 11-12 and 15-17 depict the device (generally designated as 20 which includes the forked support unit 1 and an anchoring strap or member 21) and its use upon a pole shaped projecting object. with reference to the preferred forked support unit 1 (as shown in FIGS. 1-4), the leveraged forked support unit 1 comprises:

(a) a main support frame 2 (frequently referred to as a lever member);

(b) a forked end 3 (also referenced herein as a projecting forked member) extending outwardly from a first end portion 4 of the support frame 2, with the projecting member being fitted with terminal penetrating tips (referenced as 5 and 6) for laterally penetrating the surface and anchoring the support unit onto a vertical projection (e.g. such as illustrated in FIGS. 5 and 6); and (c) a mounting means (generally designated as 7 and further referenced as a pivotal left mount 8 and right mount 9 in the Figures) for laterally securing an anchoring member 21 (not shown in FIGS. 1-4) to said frame 2 at a mounting position sufficient to permit the penetrating tips 5 and 6 of the forked projection 3 to swing upwardly and anchor the support unit 1 onto the vertical projection when the anchoring member 21 is drawn tauntly about a vertical projection by a downward leveraged force exerted onto an opposing support frame end 10 of the forked support unit 1 as illustrated by FIGS. 15 and 16.

The particular shape, configuration and dimensions of the projecting forked member 3 (including prongs 3a and 3b and penetrating tips 5 and 6 as shown in FIGS. 1-4), the support frame 2 (which serves as a lever member thereto), and the positioning of the anchoring mount 7 thereupon, collectively and cooperatively afford a pole ascending and weight supporting device substantially departing in its operational mode from that of conventional devices.

With reference to FIGS. 5 and 6, there is illustrated the portable support device 20 of this invention in a firmly anchored and secured position onto a tree section. The support device 20 generally comprises the aforementioned forked support unit 1 and a anchoring support member 21 secured onto forked unit 1 for engagement onto a vertical projection. The FIG. 5 side view depicts the forked unit and a support strap means 21 (e.g. a chain), adjustably secured to mounts (8 and 9), and drawn tauntly about a tree with the penetrating tips 5 and 6 thereof penetrating into the tree interior, the combination of which firmly secures and anchors the device onto tree for the support of weighted objects thereupon. The cross-sectional FIG. 6 view taken along line 6—6 of FIG. 5 shows the penetrating tips 5 and 6 in conjunction with the flexible strap 21 firmly securing and anchoring the device 20 onto the tree section. This device may be effectively used to ascend or descend vertical projections, the surface of which may be penetrated (such as a tree or other wooden pole objects) by penetrating tips 5 and 6.

The leveraged forked unit 1 and anchoring support member 21 combination fulfills unique cooperative functions heretofore unfulfilled by conventional devices. The device 20, as depicted in the Figures, is designed to provide a three point, anchoring engagement onto the vertical projection. The support strap means 21 and the forward portions of the forked projecting member 3 serve as the vertical projection engaging components thereof. The present device 20 more uniformly distributes the weight bearing load amonst its vertical projection engaging components. When the support strap means 21 (such as the depicted chain therein) is initially looped about the vertical projection and laterally secured onto forked unit 1 via chain mounting means 8 and 9 so that the device 20 is horizontally pitched upwardly (as illustrated in FIG. 15) and thereafter a downwardly force is then exerted upon lever member 2, uniform and, a concurrent biasing force is exerted upon strap 21 and each pronged projection (3a and 3b) of the forked member 3. The downwardly leveraged force exerted by a user upon the device 20, draws the looped strap 21 tightly against the tree whereupon the tightened strap 21 at anchoring mount 7 serves as a fulcrum site which pivotally enables the penetrating tips 5 and 6 (in an upwardly swinging motion) to penetrate the sub-surface of the vertical projection and thereby firmly anchor the device 20 thereto (such as illustrated in FIGS. 5, 6 and 16). The leveraging effect of this device 20 enables the user, with little effort, to easily secure and firmly anchor the device 20 onto the vertical projection. It will be further observed from the anchored device shown in FIG. 5 that the lateral positioning of strap or chain 21 upon the tree rests substantially in parallel alignment with major planar axis of forked unit 1 as well as in a substantially lateral and horizontal aligning relationship to the left mount 8 and right mount 9 of mounting means 7. This substantial horizontal alignment relationship effectively locks the device 20 onto tree in an analogous manner to a cargo hold chain tie bind in the latched position. The device 20 of this invention will retain its substantial perpendicular interrelationship to the vertical projection until overtly dislodged therefrom. A pull-over effect (such as a complete upwardly swing or arching of the penetrating tips 5 and 6 through and out of the tree sub-surface) will not occur under normal usage. The device 20, when locked and anchored onto a vertical projection, will generally require an overt upwardly leveraged force to disengage or dislodge the penetrating tips 5 and 6 therefrom. This protects the user against unintentional disengagement thereof or accidental injury.

The main support frame 2 contributes a multiplicity of functional purposes to the device 20. The main support frame 2 effectively serves as a rigid support for the forked porjecting member 3 and as a suitable mounting means for securing the supportive strap 21 (a supportive anchoring guy) onto forked unit 1. It also functions as an effective lever or bar for tightly drawing the mounted strap 21 about the vertical projection and to form a pivotal axis about the guy mount to drive or wedge the penetrating tips 5 and 6 into the interior sub-surface of the projection. The main frame 2 also serves as a support frame for mounting accessories such as seat, stand, platform, etc. thereupon.

The dimensional and construction characteristics of the forked support unit 1 and its component parts may be appropriately adapted so as to coincide with the intended weight bearing use of the device 20. Smaller and lighter weight construction materials may be used when support device 20 is intended for use in support of relatively light weight objects (such as animal and bird feeders, bird shelters, etc.) as opposed to those intended to support humans or other more weighty objects. In the former, a relatively light gauge metal wire (steel, aluminum, etc. wire stock) or the like may suffice whereas in the latter application a stronger construction such as heavy metal stock (e.g. steel, aluminum, rod or flat stock, etc.) will be required to structurally support the weighted object. In comparison to conventional devices, a substantially smaller and lighter weight construction will generally afford a greater load bearing capacity than currently afforded by the much larger and more weightier prior art devices.

The over-all length of the forked unit 1 may likewise be varied so as to fit its intended use. In a peg type forked unit design such as for bird feeders and the like, the over-all length may measure only about 5 millimeters (mm) or more; whereas in larger platform type support forked units 1 it may measure up to 100 centimeters or more in length. For most adaptations, the over-all length of unit 1 will typically be greater than about 5 cm with about 10 cm or more length being most typically adapted for use in a device adapted to support heavy objects. An over-all length ranging from about 10 cm to about 20 cm will generally suffice for devices primarily intended for use as climb steps (e.g. tree steps); whereas devices which are adapted for use as a work platform etc. will more typically range from about 15 cm to about 40 cm in length and most typically from about 20 cm to about 30 cm in length.

The combination of the downwardly extending forked projection 3, mounting means 7 and main support frame 2 affords a significantly greater leveraged force (with a minimum effort) to firmly wedge and anchor the penetrating tips onto a vertical projecting object. The relative ratio of the leveraged main support frame 2 length (as measured from the distal end 10 along the top edge of the main frame 2 to its jointer to the forked projection 3) to the forked projection 3 or forked end 3 length (as measured along its jointer to the main frame 2 to the tipped end of penetrating tips 5 and 6) may be effectively used to enhance the leveraging efficacy of the device 20. In general, the leveraging main frame support 2 length will advantageously be of a greater length than the length of the forked projecting member 3. More typically the relative ratio of frame 2 length to forked end member 3 length will be at least 4:3. A relative ratio of leveraged main support frame 2 length to forked projecting member 3 length ratio of at least 3:2 and preferably about 2:1 or higher (e.g. about 2:1 to about 4:1) have been found to be particularly well suited for this purpose.

The forked end 3 serves to anchor and stabilize the device 20 onto the vertical projection. The forked member 3 advantageously comprises a plurality of outwardly and downwardly radially extending prongs such as the left prong 3a and the right prong 3b as depicted in FIGS. 1–4 and 7–9. This will generally require at least two projecting prongs (e.g. prongs 3a and 3b fitted with penetrating tips 5 and 6) spaced sufficiently apart so as to permit the forked end 3 to firmly and securely anchor the device 20 onto a vertical projection. Although the forked end 3 may include more than two outwardly and downwardly extending prongs, optimum functional performance and stability are best accomplished simply by fitting the unit 1 with a pair of the illustrated pronged extensions 3a and 3b. As may be further observed from the Figures, prongs 3a and 3b are most appropriately substantially commensurate in length which, in turn, contributes towards greater uniformity in penetration and the anchoring of the device onto the vertical projection. The use of two outwardly and downwardly radially extending prongs 3a and 3b (such as illustrated in the drawings) also permits the device 20 to more universally match the diverse circumferences of wilderness trees while also allowing the terminal penetratig tips 5 and 6 of the pronged extensions 3a and 3b to more effectively penetrate and anchor the device 20 thereto.

If the unit 1 is equipped with more than two pronged, the additional prongs are advantageously paired in closely juxtapositional relationship so as to provide in effect two projecting pronged sites for penetrating engagement. When the device 20 is intended for use in cylindrical shaped vertical projections (e.g. trees, utility poles, etc.) and three or more projecting prongs spaced are used, the outer prongs will generally be of greater length than a more centrally disposed prong or prongs so as to better match the variable circumferences of such projections. Alternatively and less desirably, such protruding prongs may be positioned apart in a substantially parallel relationship (not shown) by modifying the main frame 2 construction to include a prong retention member (not shown) running perpendicular to the major longitudinal axis of the main frame 2 and attaching the downwardly extending prongs thereto in a substantially parallel relationship therebetween.

The penetrating tips 5 and 6 are advantageously spaced sufficiently apart so as to effectively prevent the engaged device 20 from twisting about its longitudinal axis. The lateral distance between penetrating tips 5 and 6 of the device may be varied to match the load bearing capacity of the device. The smaller devices 20 may be spaced apart by only 2 mm or less while in the larger devices 20 the lateral spacing may be 30 cm or more. In devices 20 adapted to support humans, the lateral distance between the penetrating tips 5 and 6 will most appropriately range from about 2 cm to about 25 cm, advantageously from about 3 cm to about 15 cm and preferably from about 5 cm to about 10 cm.

The protruding prongs 3a and 3b for devices 20 of a lighter weight bearing capacity may be shorter in length than those which are designed for a heavier weight support. Prongs 3a and 3b measuring about 2 cm or less in length and more typically 4 cm or more in length may be utilized in smaller units; whereas a forked unit 1 designed for use to support more weightier objects, a projecting forked member 3 of length of about 5 cm or more (e.g. about 5 cm to about 20 cm) and advantageously from about 5 cm to about 15 cm (preferably about 8 cm to about 12 cm) are more appropriate.

The forked unit 1 may also appropriately incorporate penetrating tips 5 and 6 of a design or configuration so as to effectively limit penetration and potential tree or pole damage while also serving as a means for more uniformly distributing and equilibrating the biasing force exerted amongst the component parts of the device 20. The smaller weight supporting devices may, if desired, be fitted with more sharper penetrating tips 5 and 6 than those for use in more weightier objects. Lighter construction materials such as aluminum, steel, etc. wires of sufficient structural strength to permit the device to function as a leveraged tool and support for the intended weight and equipped with relatively sharp tips to facilitate the penetration of wooded objects may be used in the former. In larger and more sturdy weight bearing capacity devices (such as shown in the Figures), more heavily constructed pronged extensions 3a and 3b are used. Advantageously the penetrating tip portions thereof are of a blunted tip design so as to limit the penetration to less than two inches and preferably about one inch or less under when subjected to a leverage force of 150 pounds.

The downward pitch of the forked projections 3a and 3b (as measured by the intersecting angle formed between the major longitudinal axis along the top edge of the support frame 2 and the major plane of the lateral axis along the top edge of prongs 3a and 3b (referenced in FIG. 2 as arc $r_p$) may also be used to advantage to enhance the leveraged force of the device 20. If desired, the prongs may be of a curvi-linear design similar to that of certain nail pulling claws of a conventional carpenter's hammer with a straight line drawn from the projecting tip edge to opposing end 10 being used as a lateral axis reference line in determining angle $r_p$. The downward pitch will normally be greater than 15 degrees and usually less than 60 degrees and most typically within about 25 degree to about 55 degree range. An angular pitch ranging from about 30 degrees to about 50 degrees and particularly within about 35 degree to about 45 degree range affords exceptional leveraged and cooperative efficacy in the devices of this invention.

In relationship to the major longitudinal axis of the main frame, the pronged projections 3a and 3b are also advantageously pitched radially outward. The combination of downwardly and outwardly extending prongs (e.g. 3a and 3b) such as depicted in the Figures significantly contributes towards the over-all stability of the device. The outward pitch of each pronged projection in relationship to the longitudinal vertical bisect of lever member 2 (respectively referenced as arcs $r_a$ and $r_b$ of FIG. 1) will advantageously be more than 10 degrees but less than about 60 degrees. In a more limited aspect of the invention the combined angular pitch as ascertained by the angle formed between the major internally disposed longitudinal planes formed by prongs 3a and 3b (i.e. combined total of arcs $r_a$ and $r_b$ degrees) will generally fall within about a 20 to about an 80 degree range and advantageously within about a 25 degree to about a 50 degree range with a combined outward angular pitch therebetween ranging from about 30 degrees to about 45 degrees being particularly well suited for most devices herein. In the preferred embodiments (as illustrated in the Figures), the angular pitches of the pronged projections 3a and 3b are symmerical in outward and downward pitch as well as in length so as to uniformily distribute the weight and optimize stability therebetween.

The mounting means 7 provides a fulcrum site for leveraging and wedging the penetrating tips 5 and 6 into the vertical projection. The fulcrum site arises when the guy support member 21 (anchored onto the mount 7 and the vertical projecting object) is drawn tauntly onto the mounting 7 site whereupon it then functions as pivotal fulcrum site for biasing the penetrating tips upwardly and inwardly into the vertical projecting object sub-surface. Although such mounting means 7 may be secured onto the forked projecting member 3, the mounting means 7 are advantageously positioned sufficiently rearward from the penetrating tips 5 and 6 so as to permit the device 20 to effectively function as a leveraged tool. Definitive functional and operational advantages, however, may be further achieved by positioning the mounting means 7 onto the main support frame 2, and advantageously in a rearward positioning relationship to projecting forked member 3. The Figures illustrate a particularly effective positioning of the mounting means 7 onto the forked unit 1. As illustrated therein, the guy or strap engaging mount 7 is vertically positioned along the lever member 2 at a longitudinal site above the centroid of the joining juncture between the forked end 3 and the lever member 2. In such a positioning relationship, the mounting means 7 allows the chain 21, the main support frame 2 and mounting sites 8 and 9 to be positioned in a substantially horizontal alignment with one another when the device is secured and anchored onto the vertical projection, and permits the main frame 2 to be aligned in a substantially perpendicular relationship to the vertical projection as illustrated in FIGS. 5 and 6. This permits the device 20 to be firmly anchored and locked onto the vertical projection. It will also be observed that the upper or leading edges of prongs 3a and 3b (such as illustrated in FIGS. 1-6) embody leading flat edge or top edge. This more limited embodiment effectively limits further upwardly swinging movement of the penetrating tips 5 and 6 through the vertical projection and facilitates the maintaining of the main frame 2 in a substantially prependicular relationship onto the vertical projecting object.

If the mounting means 7 are positioned too far from the penetrating tips 5 and 6, it becomes more difficult to downwardly bias the lever member 2 onto the vertical projection in a substantially perpendicular relationship. As a result, the device 10 will not firmly anchor and lock onto the vertical projection. This problem may be partially alleviated by extending the main support frame 2 lewngth or by a bar extension or adapter thereto so as to permit a greater leveraged force to be exerted upon the device 20 or alternatively by providing sharper penetrating tips 5 and 6 to permit the forked end 3 to more easily penetrate into the vertical projection. Conversely, if the mounting means 7 are positioned too near to the penetratng tips, the device 20 may pull over or pass through the desired perpendicular alignment onto the vertical projection. Appropriate positioning of the mounting means 7 along the support frame 2, thus, effectively permits the proper anchoring and locking onto the vertical projection.

The mounting means 7 may comprise a permanent mount or an adjustable mounting system such as the mounts 8 and 9 as shown in the Figures. Similarly, the mount may, if desired, consist of a single forked unit mount or a multiple mounting system as depicted in the Figures. When multiple stop engaging mounting sites are employed, the multiple sites are preferably positioned in a lateral and juxtapositional aligning relationship along the lever member so as to serve as a substantially common fulcrum point therefore. A device comprising an adjustable combination of the forked unit 1 and a guy anchoring member 21 (e.g. such as a linked chain) in which the forked unit 1 includes at least one mounting site for variably adjustment onto guy member 21 (such as the hooking connective projections as afforded by 8 and 9 or vise versa) so as to adjustably match the vertical projection circumference provides a particularly effective device 20. The outwardly and rearwardly extending legs 8 and 9 as illustrated in FIGS. 1, 3 and 7 are particularly useful for operational engagement of chain links or apertured band straps as depicted in FIGS. 5-6, 12, and 15-17.

If desired, the main frame 2 may be also provided with variably means of adjusting the mounting means 7 to match the leveraging force exerted by the user of the device 20. This may be accomplished by providing a plurality of mount sites 7 (e.g. lever frame apertures for guy member hooks, lever hooked projections for guy member apertures, etc.) along the upper portion of the main frame which the user may then appropriately adjust to provide appropriate fulcrum site to match the intended user's weight and alignment onto the vertical projecting object. Such variably adjusting mounting means are not generally required since the device 20 as illustrated in the drawings is properly leveraged so as to effectively serve a relatively broad weight support and biasing force range.

The mounting means 7 fulcrum site advantageously disposed onto the main frame 2 at a position (as measured from the penetrating tips 5 and 6 to the fulcrum site) ranging from about 30 percent to about 70 percent of total over-all unit 1 length and preferably at a position ranging from about 40 percent to about 60 percent of its over-all length.

The support strap means functions as a guy support 21 and provides an ancoring bridge between the vertical projecting object and the forked unit mount 7. The guy strap 21 is firmly anchored therebetween so as to permit a leveraged force to be exerted upon the forked unit 1. The support member 21 forms a substantially rigid bridge when drawn tightly away from the vertical projecting object by the leveraged forked unit movement. The strap support means 21 may include a variety of guy members which in cooperative association with mount 7 will permit the lever member 2 to function as lever when the strap 21 is appropriately anchored onto a vertical projection and mount 7. Although the anchoring of strap 21 to the vertical projection object may be accomplished by a fixed mount thereto (e.g. a hooked or eyelet treaded wood screw, etc.) with a single strap leading therefrom to mount 7. A support strap means 21 which loops or envelops the object is preferred. Substantially inelastic materials such as metallic materials (e.g. aluminum, steel, etc.), natural fibrous materials (e.g. leather, silk, canvas, manila hemp, etc.), synthetic plastic materials (e.g. Rayon, Nylon, polyethylene, polypropylene, etc.) and the like may be used for this purpose. Strap 21 may illustratively be in a linked chain rope, braded, belted, wire, band, etc. or other appropriate form which will advantageously permit its looped engagement onto the vertical projection. The support strap 21 is advantagesouly constructed of a material having sufficient flexibility and length, which in combination with the forked unit, will circumscribe the vertical projecting object while affording adequate structural strength for its intended use. The strap 21 will advantageously include a variably adjustable means for strap 21 to be matingly and tauntly drawn onto the vertical projecting object. If desired two or more separate flexible straps 21 may be securely mounted onto the forked unit 1 at a common fulcrum site such as by metal fasteners (e.g. bolts and nut combinations, riveting, etc.) and fitted with buckles, frictional gripping devices (e.g. such as commonly used in vehicular safety seat belts, boat trailer straps); ratchet and pawl tightener combinations (e.g. as commonly used in appliance dollies); hooks and loops or eyelet combinations and the like so as to permit the strap 21 to be circumferentially looped about a vertical projection and adjustably tightened sufficiently to permit the projecting tips 5 and 6 to be pivotally forced upwardly and inwardly onto the vertical projection. A strap 21 having one or both strap ends equipped with means of variably adjusting the strap length to match the vertical projection dimensional size such as a linked chain or apertured steel bands as depicted in the Figures has been found to be particularly effective for this purpose. The strap 21 may be suitably provided with a plurality of apertures (e.g. see FIGS. 5-6, 12 and 15-17) or hooks (not shown) spaced sufficiently apart so as to provide the desired variable adjustments and a corresponding mounting hooks or apertures for engagement onto mount 7. A strap 21 which may be detachably and variably mounted onto the main frame 1 such as a chain or similar apertured strapping device and means for receivingly engaging the strapping device thereto such as mounting legs 8 and 9 as illustrated in the Figures is particularly well adapted to the device 20 of this invention. Also a pull through rope such as those currently used in conventional tree stands (e.g. an accessory item currently identified as Speed-Hitch Rope, Code SH, manufactured and distributed by Loc-On Company, 1510 Holbrook Street, Greensboro, N.C. 27403) fitted with S hooks for securance onto the main frame 2 at mounts 8 and 9 as shown in the Figures may also be effectively used as a flexible strap 21 herein. The particular strap 21 selection depends largely upon the intended usage as depicted in Figures. In the tree ascending and seating embodiments of this invention a chain or pull-through rope are preferred, whereas in a platform device a metal strap or band which substantially retain its circumventing integrity so as to permit it to be slid upwardly about the tree surface when disengaged as illustrated in FIG. 16 and anchored to the tree at the desired elevational level (as depicted in FIG. 17) is preferred.

The forked unit illustrated in FIG. 7-9 is similar to that shown in FIGS. 1-4 except for replacement of the flat iron stock projecting prongs 3a and 3b with steel rod stock complementarily beveled at one end so as to provide the proper outward and downward pitch and at the other end to provide the penetrating tips 6 and 7 therefore. The preferred embodiments as depicted in FIGS. 1-4 provide penetrating tips 5 and 6 wherein the leading top edge thereof is substantially flat while the beveled underside following edge form a penetrating tip which effectively penetrates the wooded object to the desired depth while the leading flat edge effectively limits further upward movement thereof when the tip has reached its maximum penetrating depth.

The basic structural components of the support device 20 may be readily adapted to a variety of weight supporting accessories as depicted in FIGS. 10-17. The specific leveraged support frame 2 described herein affords an O.D. mating onto the I.D. of a conventional bicycle handle grip which when inserted thereupon become rigidity affixed thereto and provides a convenient carrying, gripping and stand handle therefore as depicted in FIG. 5.

FIG. 10 depicts a seating accessory 30 mounted onto the device 20. The seating platform 31 is mounted onto frame 2 by a pair of recessed carriage bolts 32 (depicted by the ghost lines) passing through correspondingly registering bolt holes in the platform 31 and main frame 2 secured by wing nut fastener 33. If desired, a pair of laterally spaced angle irons or channel iron registering onto the lever member 2 sides and means for securing it thereto may alternatively be used as an undercarriage mount.

In FIGS. 11-17, there is also disclosed a platform stand assembly (generlly designated as 40) which may be mounted onto the device 20 (particularly the lever member 2) and used as platform stand upon a tree or other pole-shaped object as illustrated in FIGS. 15-17.

FIG. 11 illustrates a side view of a platform assembly (generally designated as 40) mounted upon the forked unit 1. The depicted platform assembly 40 is designed to provide a firm supportive mount of platform 41 onto the main frame 2 by means of a supportive undercarriage 42 which is adapted to slideably engage and secure onto the main frame 2. With particular reference to FIG. 11 and 12, the forked unit 1 is shown with a fitted steel band strap 21 mounted at mounts 8 and 9 tauntly circumscribing a tree section with tips 5 and 6 penetrating and firmly anchoring (in combination with guy band 21) the device 20 onto the tree. The platform 41 or decking may be any appropriate construction material such as wood, exterior grade plywood, metal (e.g. steel or aluminum plate, diamond check, etc.), thermoplastic such as the high-strength impact thermoplastic materials, thermoset composites, mixtures thereof and the like. The platform assembly 40 advantageously includes means for detaching and securing the platform assembly 40 onto the forked support unit 1. The platform assembly 40 may be of a unitary construction such as a molded or cast thermoplastic, thermoset or metallic materials fitted with means for its securance onto the supportive device 20.

The particular platform accessory depicted in FIGS. 11-13 includes a platform portion 41 fitted with a supportive undercarriage unit 42 which correspondly registers and mates onto frame 2. The illustrated supportive undercarriage unit 42 includes a longitudinally extending recessed channel (generally designated as 43) therewithin (open or closed) advantageously sized for slideably engaging onto the main frame 2 and sufficiently registering therewith to substantially prevent twisting or pivotable movement of the platform accessory 40 about the longitudinal axis of lever member 2. Channel 43 may be suitably constructed of a first flanged channel iron 43a having a channel recess of sufficient width and depth to snuggly house and slideably engage onto the support frame 2 and band strap 21, and a pair of outwardly longitudinally extending flanged rails 43b and 43c, a second longitudinally extending channel iron 43d having a recessed channel of sufficient O.D. width to snugly fit between the internally disposed sidewalls of band strap 21, fitted with a pair of mating rail flanges 43e and 43f welded onto upper surface of the first flange rails 43b and 43c with the recessed channel O.D. depth of the second channel being sufficient to interfacially mate onto the flat upper surface of the support frame 2. The resultant enclosed channel 43 thus formed interfacially mates onto the upper and lower edges of support frame 2 with sufficient channeled width therewithin to interfacially mate onto the support frame sidewalls fitted with external strap 21. A pair of bolts 44a and 44b extending through the first channel and the support frame secured thereto by wing nuts 45a and 45b firmly mount the platform accessory 40 onto the support frame 2. The platform under-carriage 42 is designed to permit its removal from the support frame by removing the bolts and removing the platform accessory 40 from its mount.

FIG. 14 shows a top view of the tree platform accessory 40 (depicted in FIGS. 11 and 12) mounted onto the forked support unit 1 with platform 41 being equipped with a pair of toe holds 46 and 47 which enable the user to disengage and raise the tree platform 40 and anchor it thereto by foot action.

FIGS. 15-18 illustrate the use of the forked support device 20, the seat 30 and platform 40 accessory to support a person at an elevated position upon a tree section.

FIG. 15 depicts a woodsman standing upon a forked unit fitted with the platform accessory of FIGS. 11-12 securely anchored onto a tree and gripping onto the weight support unit 1 with the penetrating tips 5 and 6 resting flushly against the tree surface, the strap 21 secured about the tree and properly adjusted onto mounts 6 and 7 to permit the lever member 2 to project upwardly and outwardly from the vertical plane of the tree, but with sufficient tauntness to enable mounts 6 and 7 to function as a pivotal fulcrum site for driving the penetrating tips upwardly and inwardly into the tree interior when the user exerts a downward force upon lever member 2.

The general methodology of using the device 20 to support weighted objects thereupon as illustrated therein entails initially anchoring the guy strap 21 about the vertical projection and to mounting legs 8 and 9 at the desired height with penetrating tips 5 and 6 interfacing onto the vertical projection surface and applying sufficient leveraged force onto the anchored device 20 as to force the penetrating tips 5 and 6 into the vertical projection. Strap 21 is advantageously initally anchored about the vertical projection and mount 7 in a sufficiently taunt relationship therebetween so that when a downwardly biasing force is applied upon the distal end 10, the penetrating tips 5 and 6 of the device 20 will pivot sufficiently upward to place the main support frame 2 and strap 21 substantially in parallel alignment with one another and in a substantially perpendicular relationship to the vertical projection as illustrated in FIGS. 5, 6, 11, 12 and 17. In such a relationship, the device 20 will remain firmly locked and anchored onto the vertical projection.

FIG. 16 illustrates the woodsman elevating the tree support platform (i.e. the platform accessory 40 mounted on the weight support device 20) by pulling upon the upper weight support device while concurrently raising the mounted tree platform accessory and by pulling upwardly and forwardly (i.e. towards the tree) upon toe holders 46 and 47 of the tree platform 40 which causes the penetrating tips 5 and 6 to swing (downwardly and outwardly) and to disengage their anchoring hold onto the tree and to slacken the band strap 21 tension. This permits the tree platform 40 to be slideably pulled upwardly and positioned at a higher tree elevation. Upon proper elevational positioning, the woodsman (while supporting himself upon the upper forked mount device) simply applies a downwardly and inwardly force upon the tree platform 40 to tighten band 21 and thereby provide an anchored pivotal fulcrum site at mounts 8 and 9 which allows the penetrating tips 5 and 6 to then swing fowardly towards the tree and upwardly. If a higher tree platform elevation is desired, the woodsman simply disengages the upper support device 20 by lifting the lever member 2 upwardly and pivotally swinging the penetrating tips downwardly and outwardly from the tree reanchors the upper support device 20 at a higher elevational (as illustrated in FIG. 15) and sequentially repeats this procedure until the desired tree elevationis reached. FIG. 17 illustrates the woodsman seated upon the weight support device 20 of this invention fitted with the seat accessory 30 of FIG. 10 with his feet resting upon the weight support device 20 fitted with the tree platform accessory 40 depicted in FIGS. 11 and 12.

In the preferred embodiments, the support forked unit 1 (as illustrated in FIGS. 1-4) is of a design and construction so as to safely support a human weight ranging from about 100 to about 350 pounds. Prongs 3a and 3b, as well as the main frame 2 may be suitably fabricated from flat steel stock (e.g. measuring ¼" thick and 1" in width.) The main frame may be pre-cut by cross-cutting (at 90 degrees) a flat stock rail to a 7 inch length. Prongs 3a and 3b section may then be prepared by cross-cutting at 90 degrees from an 8 inch section from the flat stock. The 8 inch section may then be diagonally cross-cut at a 45 degree angle so as to provide a pair of prong sections measuring 4½ inches across the uppermost leading edge (i.e. from the 90 degree cross-cut to the tip of the penetrating tip points) and 3½ inches along the opposing or lower edge of the flat stock cut. The legged projections 8 and 9 for the pivotal mounting means 7 may each be pre-cut from ¼" diameter steel rod stock to a 1" length each. In the assembly of the forked unit 1, prongs 3a and 3b may be respectively flushly and oppositely clamped onto the main frame 2 (via welding clamps) so uppermost leading edge of the 90 degree cross-cut of the flat stock (i.e. on the 4½" uppermost edge) is cornered onto one of the uppermost main frame stock edges and the opposite leading cornered edge thereof (i.e. on the 3½" side) positioned so as to be recessed by approximately 1" from the first end of the support frame 2. The penetrating tips 5 and 6 of prongs 3a and 3b are symmetrically spaced 3" apart from one another and directly welded onto the main frame 2. The protruding prongs 3a and 3b as thus assembled and welded onto the main frame 2 angularly projected downwardly from the major main support frame 2 at about 37 degrees as ascertained from the intersecting vertex of the major longitudinal axis of the main frame and the major planar axis of the protruding prongs with each of the prongs 3a and 3b radially projecting outwardly from the bisecting major longitudinal planar axis of the main frame by about 18.5 degrees so as to form angular radii of about 37 degrees therebetween (as measured along the major planar axis of the outwardly extending prongs 3a and 3b). The ¼" by 1' steel rod prong sections were clamped and welded oppositely onto the main frame 2 in juxtaposition to the top edge and removed about 1½" from the first end of the main frame 1 in substantial parallel alignment in relationship to the top edge of the main frame with a straight rearwardly and radially outwardly pitch of about 22.5 degrees in relationship to major longitudinal axis of the support frame 2. It will be observed that the radially extending prongs (3a and 3b as illustrated in the FIGS. 1-6, and 9) forked unit 1 are thus made of a sturdy steel flat stock (¼"×1") construction. The terminal ends of the flat steel stock for prongs 3a and 3b have been appropriately cross-cut at a suitable angle so as to limit penetration of penetrating tips 5 and 6 into a vertical projection with a direct relationship to the intended weight bearing capacity of the device 20. This permits the device 20 to be firmly and securely anchored onto a vertical projection while the leading upper flat edged of tips 5 and 6 and adjacent prong area thereto are of a design so as to inhibit further upwardly movement of the tips 5 and 6 when the device 20 has been anchored and locked onto the vertical projection. Such penetrating tip design and construction will typically limit prong penetration to about ¼" to ¾" inches in a hard wood (e.g. oak) at 170 pound pressure.

A straight link chain (1" link—520 pound capacity) and a 1¼" band (1¼" 1/16") fitted with a plurality of registering mounting apertures served as the anchoring supportive brace 21 for the devices illustrated in the Figures. The weight support devices of this invention are capable of supporting extremely heavy objects and especially when the mounting members 8 and 9 and prongs 3a and 3b welds to the support frame 2 are adequately reinforced.

The leveraged and weight bearing characteristics of the device herein optimize its functional utility while allowing for a more compact and over-all lighter weight construction than heretofore afforded by the conventional devices. The present device represents as a unique weight bearing tool in which the component parts cooperatively function together and upon the vertical projecting object to provide the particularly effective weight supporting device 20. Unlike conventional devices, the present device 20 does not simply hang upon the vertical projection, but rather relies upon a cooperative interrelationship between its components and the object to firmly anchor and lock the device 20 onto a vertical projection.

The devices of this invention possess exceptionally high weight bearing capacity, especially when viewed within the context of its compact and relatively lightweight construction. The forked unit 1 specifically described herein will safely support (when equipped with a chain, cable, strap or rope support member of sufficient anchoring support strength) weighted objects well in excess of 200 pounds (e.g. about 200 to about 800 pounds) and more typically in excess of 300 pounds. Such a weight bearing capacity is especially surprising for a forked unit 1 weighing less than 1.5 pounds with a total over-all length of less than one foot.

What is claimed is:

1. A forked support device for use in supporting weighted objects upon a vertically projecting object having a surface which may be penetrated by a sharpened object which device comprises a forked implement and a support strap for attachment onto the forked implement and the vertical projecting object, said forked implement comprising a supportive lever member, a forked and extending downwardly and outwardly from said lever with said forked end being equipped with vertical object penetrating tips, and a strap engaging mount positioning along the major longitudinal axis of said forked unit at a fulcrum site sufficient to permit the penetrating tips to pivotally swing outwardly and upwardly about the fulcrum site when the support strap is attached onto the forked implement and the vertical projecting object, and a sufficient downwardly force is exerted upon said lever to cause the penetrating tips to penetrate the vertical object.

2. The device according to claim 1 wherein the support strap is characterized as having sufficient length and flexibility for looping about the vertical projecting object and attachment onto the strap engaging mount.

3. The device according to claim 1 wherein the strap engaging mount and the strap support includes a means for variably adjusting the strap to accommodate the size and configuration of the vertical projecting object.

4. The device according to claim 3 wherein the strap consists of at least one member selected from the group consisting of a linked chain, a rope and a steel band member.

5. The device according to claim 1 wherein the strap in combination with the strap engaging mount includes a means for variable adjusting strap so as to accommodate a plurality of vertical projections which differ in outer dimensional size and configuration.

6. The forked support device according to claim 1 wherein the forked implement comprises two pronged substantially symmetrical projections radially extending outwardly and downwardly from one end of the lever member.

7. The device according to claim 6 wherein the lever member consists essentially of a longitudinally extending rigid bar member and the strap engaging mount is positioned upon said bar at fulcrum bearing site.

8. The device according to claim 6 wherein the two pronged projections comprise two elongated metallic bars which radially extend downwardly from said lever member at a pitched angle ranging from about 30 degrees to about 45 degrees and at an outwardly angular pitch therebetween ranging from about 30 to about 45 degrees.

9. The device according to claim 8 wherein the extending tips of the pronged projections are in the shape of a beveled projecting section extending outwardly therefrom with the upper margin thereof extending further outwardly from said lever than the correspondly lower margin thereof and the upper margin thereof possess a substantially flat edged surface.

10. The device according to claim 8 wherein the strap engaging member and the strap support includes a means for variably adjusting the strap to accommodate the size and configuration of the vertical projecting object.

11. The device according to claim 9 wherein the support strap is characterized as having sufficient length and flexibility to be looped around the vertical projecting object for attachment onto the strap engaging mount.

12. The device according to claim 10 wherein the lever member measures form about 10 to about 20 centimeters in length, the pronged projections extend outwardly therefrom about 5 to about 15 centimeters and the ratio of lever length to the distance of the pronged projections extending outwardly therefrom ranges from about 2:1 to about 4:1, the mount comprises a pair of rearwardly projecting legs laterally secured along the upper margin of the lever at a fulcrum site above the centroid joinder of the pronged projections, and the strap engaging mount includes a means for variably adjusting strap so as to accommodate a plurality of vertical projections which differ in outer dimensional size and configuration and the strap consists of at least one member selected from the group consisting of a linked chain, a rope and a metallic band member.

13. A leveraged forked support unit adapted for use and in support of weighted objects thereupon in combination with a support strap to anchor toe forked unit onto a vertical projecting object having a surface which may be penetrated by sharp objects which comprises:
  (a) a lever member;
  (b) a forked end extending downwardly and outwardly from said lever member with said forked end having penetrating tips for penetrating the surface of the vertical projecting object and;
  (c) a strap engaging mount positioned upon the forked unit at a fulcrum site so as to permit the penetrating tips to swing outwardly and upwardly and to penetrate the vertical object upon the anchoring of the support strap thereto and the application of a downward force upon said lever member.

14. The forked unit according to claim 13 wherein the forked end consists essentially of two pronged members which extend downwardly from said lever member at a pitched angle ranging from about 30 to about 45 degrees.

15. The forked unit according to claim 14 wherein the pronged members extend radially outward from the lever member at an angular pitch therebetween from about 30 to about 45 degrees.

16. The forked unit according to claim 15 wherein the engaging mount is positioned to the rear of the pronged members.

17. The forked unit according to claim 14 wherein the mount comprises a pair of rearwardly projecting legs laterally secured along the upper margin of the lever at a fulcrum site above the centroid jointer of the pronged members onto the lever member.

18. The forked unit according to claim 15 wherein the lever member measures from about 10 to about 20 centimeters in length, the pronged members extend outwardly therefrom from about 5 to about 15 centimeters and the ratio of lever length to the distance the pronged members extend outwardly therefrom ranges from about 2:1 to about 4:1.

19. A method for supporting weighted objects upon a vertical projecting object with a leveraged weight support device comprised of a strapping member for securance to the vertical projecting object and a leveraged forked unit having a lever member fitted with an outwardly and downwardly extending forked end terminated by penetrating tips and a strapping member mount positioned at a pivotal mount site for securing the strapping member thereto, said method comprising:
  (a) securing said strapping member onto the vertical projecting object and the mount with the penetrating tips of the forked unit registering downwardly upon the vertical projecting object and the lever member extending upwardly and outwardly therefrom; and (b) applying sufficient downwardly force onto the lever member to tighten the strapping member onto the mount and form a fulcrum site thereabout a cause the penetrating tips to pivotally swing upwardly and inwardly into the vertical projecting object and thereby firmly anchor the device onto the vertical projection for the support of weighted objects thereupon.

20. The method according to claim 19 wherein the forked unit include a pair of pronged members radially extending outwardly and downwardly from one end of the lever member and the fulcrum site is at a rearwardly and upwardly positioned in relationship to the pronged members and the amount of force applied in sufficient to align the lever member in substantially a perpendicular relationship to the vertical projecting object.

* * * * *